S. D. PADDACK.
SOUND PRODUCING DIAPHRAGM.
APPLICATION FILED JUNE 16, 1913.

1,102,291.

Patented July 7, 1914.

WITNESSES:

INVENTOR
Simon D. Paddack.
BY
Attorneys ary adapted for the purposes specified.

UNITED STATES PATENT OFFICE.

SIMON D. PADDACK, OF NEW YORK, N. Y.

SOUND-PRODUCING DIAPHRAGM.

1,102,291.  Specification of Letters Patent.  Patented July 7, 1914.

Application filed June 16, 1913. Serial No. 774,052.

*To all whom it may concern:*

Be it known that I, SIMON D. PADDACK, a citizen of the United States, residing in the city of New York, borough of Manhattan, county and State of New York, have invented a certain new and useful Sound-Producing Diaphragm, of which the following is a specification.

This invention pertains to sound producing diaphragms, particularly adapted for use in phonographs, and embodies the diaphragm as a new article of manufacture.

The object of the invention is the production of a diaphragm which emits clear, pure, and resonant tones, in contradistinction to the diaphragms now in use which produce tones of a more or less raspy or metallic character.

With the foregoing object in view, the invention embodies a suitable base member, preferably blotting paper, which has been rendered hard and given vibratory qualities by means of a certain chemical treatment.

The following detailed description of the manner of making the diaphragm is what I now consider the best method, but it will be understood that this is not the exclusive one, for, in all probability, other agents, more or less equivalent to those specified, may be employed to secure some or all of the advantages of my invention.

I preferably start with a piece of blotting paper of the desired size, and dip it in a suitable volatile agent or menstruum, preferably ordinary ether, although I may use, though not with the same advantage, alcohol and benzol. The blotting paper having been treated as described, I immerse it, while saturated with the solvent, in a molten mixture consisting, preferably, of Japan wax, resin, and fish glue. The proportions of the ingredients entering into this mixture may be varied within considerable limits, but the proportions, by weight, which I have found to give the best results, are substantially as follows:—Japan wax 20%, resin 60%, fish glue 20%. The ingredients are mixed together and simply heated, preferably over a water bath, to a sufficient degree to melt them and produce a homogeneous mixture. The blotting paper, or other base material for the diaphragm, having been immersed in the mixture, is withdrawn and allowed to cool, whereupon there results a hard, water-proof, sonorous disk, particularly adapted for the purposes specified.

In the accompanying drawing is illustrated a sound-producing diaphragm embodying my invention, wherein—

Figure 1:
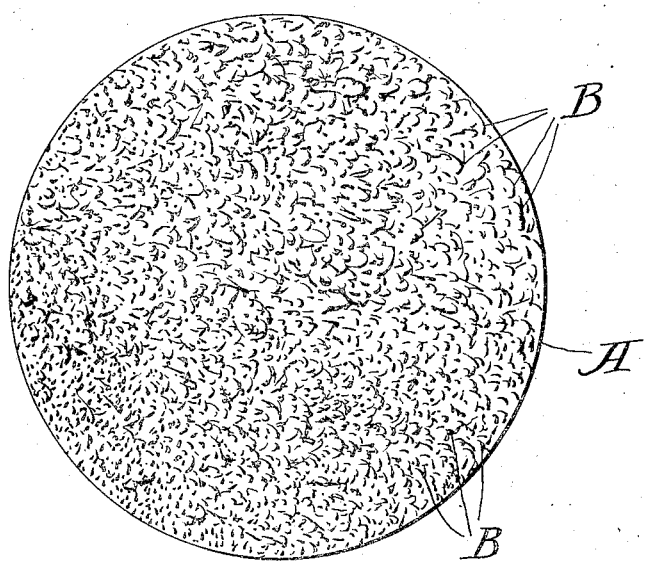
Figure 2:

Figure 1 is a face view of the diaphragm embodying my invention, and Fig. 2 is a cross section through the center thereof.

Referring to the drawings, A designates the base member, preferably embodying blotting paper, and B the composition of waxy material.

I have found I can substitute for the Japan wax in the foregoing mixture, beeswax, carnauba wax, or paraffin wax, and, doubtless, some of the numerous other waxes on the market may be used. I prefer, however, to use the Japan wax. For the fish glue specified, I may substitute gelatin, collogen, or equivalent material. The gelatin may be dispensed with, in whole or in part, and yet some of the advantages of my invention be retained in the mixture of wax and resin. I prefer, however, to use the gelatin, or its equivalent, in the manner specified.

The function of the ether, or other volatile agent, appears to be that of opening up, or loosening the pores or fibers of the base material, thereby rendering it more susceptible to the subsequent treatment. In other words, by opening the pores of the base material, the waxy mixture more readily adheres thereto, or is more easily taken up thereby. In some cases I have used softening agents, less volatile than those mentioned, though not with as good results.

When blotting paper is employed as the base of the diaphragm, treated in the manner described, it will be manifest that said blotting paper so absorbs the waxy mixture as to become saturated and coated therewith, although it will be understood that other base materials, less absorbent than blotting paper, may be employed. I have found, however, that blotting paper gives very superior results.

Having thus fully described the invention, what I claim as new, and desire to secure by Letters Patent, is:—

1. As a new article of manufacture, a sound producing diaphragm consisting of a suitable base having waxy material and a hardening agent for the waxy material incorporated therein.

2. As a new article of manufacture, a sound producing diaphragm consisting of a suitable non-metallic base having waxy material and a hardening agent for the waxy material incorporated therein.

3. As a new article of manufacture, a sound producing diaphragm consisting of blotting paper having waxy material and a hardening agent for the waxy material incorporated therein.

4. As a new article of manufacture, a sound producing diaphragm consisting of a suitable base to which has been applied a composition containing wax and resin.

5. As a new article of manufacture, a sound producing diaphragm consisting of a suitable base to which has been applied a composition containing wax, resin and glue.

6. As a new article of manufacture, a sound producing diaphragm consisting of blotting paper to which has been applied a mixture containing wax and resin.

7. As a new article of manufacture, a sound producing diaphragm consisting of blotting paper to which has been applied a mixture of wax, resin and glue.

8. As a new article of manufacture, a sound producing diaphragm consisting of a base of absorbent nature and having its pores filled with a waxy material containing a hardening agent which renders it hard and sonorous.

In testimony whereof I have signed my name to this specification in the presence of two subscribing witnesses.

SIMON D. PADDACK.

Witnesses:
M. C. RODRIGUEZ,
F. S. FITZSIMONS.